US010572412B1

United States Patent
Ward, Jr. et al.

(10) Patent No.: US 10,572,412 B1
(45) Date of Patent: Feb. 25, 2020

(54) INTERRUPTIBLE COMPUTING INSTANCE PRIORITIZATION

(71) Applicant: Amazon Technologies, Inc., Reno, NV (US)

(72) Inventors: David John Ward, Jr., Seattle, WA (US); Stephen Alden Elliott, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1064 days.

(21) Appl. No.: 14/218,809

(22) Filed: Mar. 18, 2014

(51) Int. Cl.
*G06F 13/26* (2006.01)
*G06F 9/48* (2006.01)
*G06F 9/455* (2018.01)

(52) U.S. Cl.
CPC .............. *G06F 13/26* (2013.01); *G06F 9/455* (2013.01); *G06F 9/48* (2013.01)

(58) Field of Classification Search
CPC .............. G06F 13/26; G06F 9/48; G06F 9/455
See application file for complete search history.

(56) References Cited

U.S. PATENT DOCUMENTS

| | | | |
|---|---|---|---|
| 2008/0209336 A1* | 8/2008 | Brown | G06F 17/30873 715/744 |
| 2008/0229318 A1* | 9/2008 | Franke | G06F 9/5038 718/104 |
| 2011/0126202 A1* | 5/2011 | Krauss | G06F 9/485 718/102 |
| 2012/0185776 A1* | 7/2012 | Kirshenbaum | G06F 1/3203 715/735 |
| 2012/0278607 A1* | 11/2012 | Polat | G06F 9/541 713/100 |
| 2013/0042250 A1* | 2/2013 | Lim | G06F 9/4881 718/103 |
| 2013/0179289 A1* | 7/2013 | Calder | G06Q 30/08 705/26.3 |

* cited by examiner

*Primary Examiner* — Benjamin C Wu
(74) *Attorney, Agent, or Firm* — Thorpe North & Western, LLP.

(57) ABSTRACT

A technology is described for prioritizing a plurality of interruptible computing instances. An example method may include receiving a request to interrupt an executing interruptible computing instance that may be included in a group of interruptible computing instances having assigned instance priority values. The instance priority values may establish an order in which the interruptible computing instances may be interrupted. The interruptible computing instance may be identified that has a lower instance priority value as compared to other instance priority values assigned to the interruptible computing instances. The interruptible computing instance identified may then be terminated.

19 Claims, 12 Drawing Sheets

1000
(1) Receive Interrupt Request For A Large Computing Instance
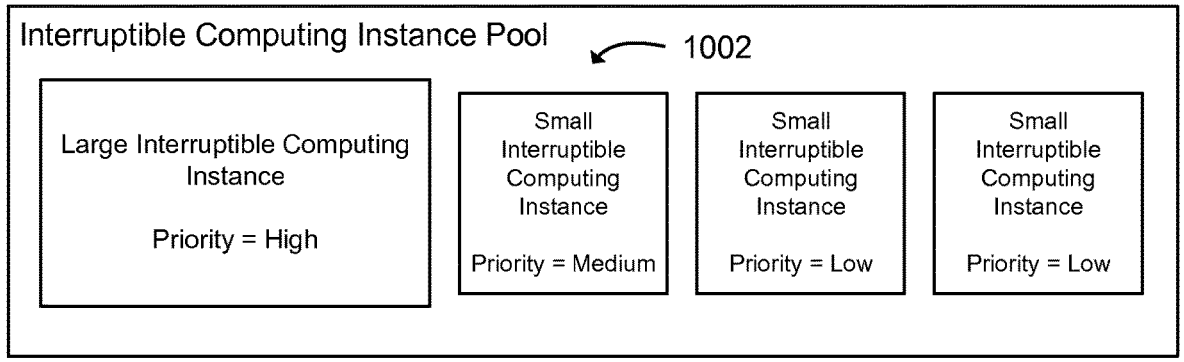
(2) Interrupt Two Small Low Priority Interruptible Computing Instances
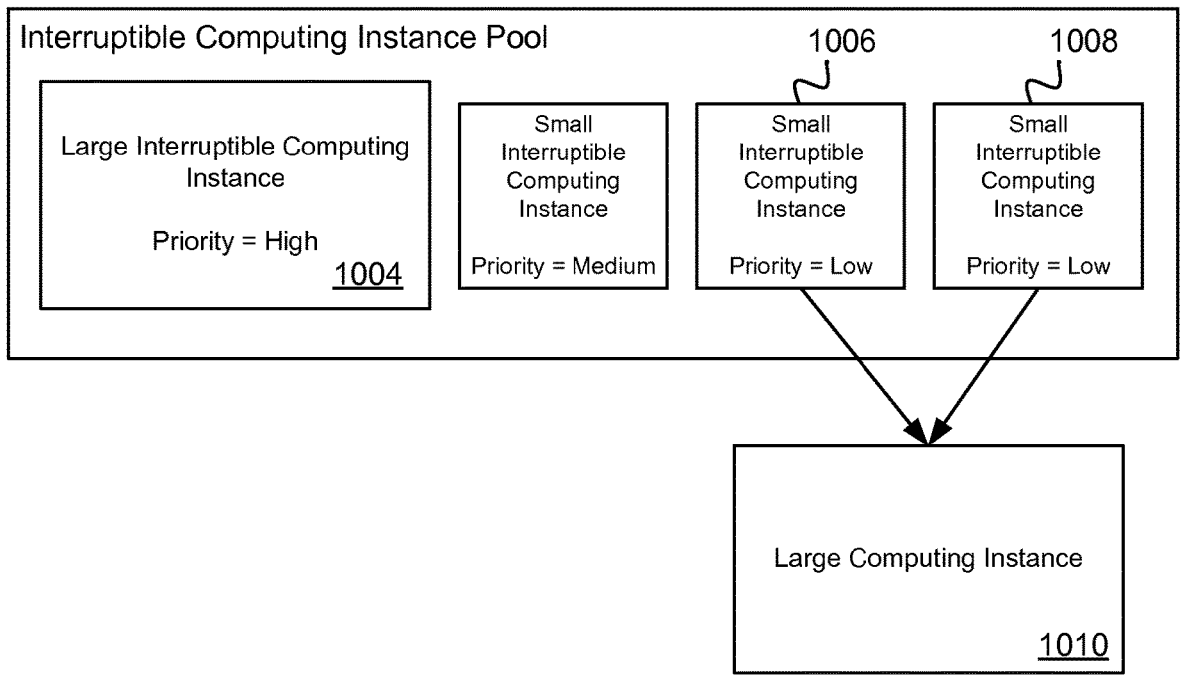
(3) Build Large Computing Instance From The Two Small Low Priority Interruptible Computing Instances To Satisfy The Interrupt Request
FIG. 10

1100 →

```
┌──────────────────────────────────────────────────────────────────────┐
│ Receive a request to interrupt a computing instance that is executing and is │
│ included in a group of interruptible computing instances having a bid price and │ ⌒ 1110
│ an assigned instance priority values that establish an order in which the plurality │
│     group of interruptible computing instances are interrupted       │
└──────────────────────────────────────────────────────────────────────┘
                                   ↓
┌──────────────────────────────────────────────────────────────────────┐
│ Identify an interruptible computing instance having a lower instance priority │
│  value as compared to other instance priority values assigned to the group of │ ⌒ 1120
│                 interruptible computing instances                    │
└──────────────────────────────────────────────────────────────────────┘
                                   ↓
┌──────────────────────────────────────────────────────────────────────┐
│           Interrupt an interruptible computing instance identified    │ ⌒ 1130
└──────────────────────────────────────────────────────────────────────┘
```

FIG. 11

INTERRUPTIBLE COMPUTING INSTANCE PRIORITIZATION

BACKGROUND

The advent of virtualization technologies for computing resources has provided benefits with respect to managing large-scale computing resources for many users with diverse needs and has allowed various computing resources to be efficiently and securely shared by multiple users. For example, virtualization technologies may allow a single physical computing machine to be shared among multiple users by providing each user with one or more virtual machines hosted by the single physical computing machine using a hypervisor. Each virtual machine may be a guest machine acting as a distinct logical computing system that provides a user with the perception that the user is the sole operator and administrator of a given virtualized hardware computing resource. Furthermore, some virtualization technologies are capable of providing virtual resources that span two or more physical resources, such as a single virtual machine with multiple virtual processors that spans multiple separate physical computing systems.

In many environments, operators of provider networks that implement virtualized computing, storage, networking, application and/or other network-accessible functionality may allow users to a bid on unused virtualized resources at a specific point in time. For example, a user may place a bid on an interruptible computing instance (e.g., current unused computing capacity). At a time that the bid placed by the user exceeds a price for the interruptible computing instance, the user's bid may be accepted and the user may have access to the interruptible computing instance until such a time that the price moves above the bid price and the interruptible computing instance is reclaimed. Interruptible computing instances may provide a user with the ability to bid on a number of specific types and configurations of computing instances for a short term. This may allow the user to avoid costs related to long term commitments for a computing instance and reduce computing costs when available computing resources are available.

BRIEF DESCRIPTION OF THE DRAWINGS

FIG. 10 is a diagram illustrating an example reconfiguration of interruptible computing instances in response to a request to interrupt an interruptible computing instance.

FIG. 11 is a flow diagram that illustrates an example method for prioritizing interruptible computing instances.

DETAILED DESCRIPTION

Figure 1:
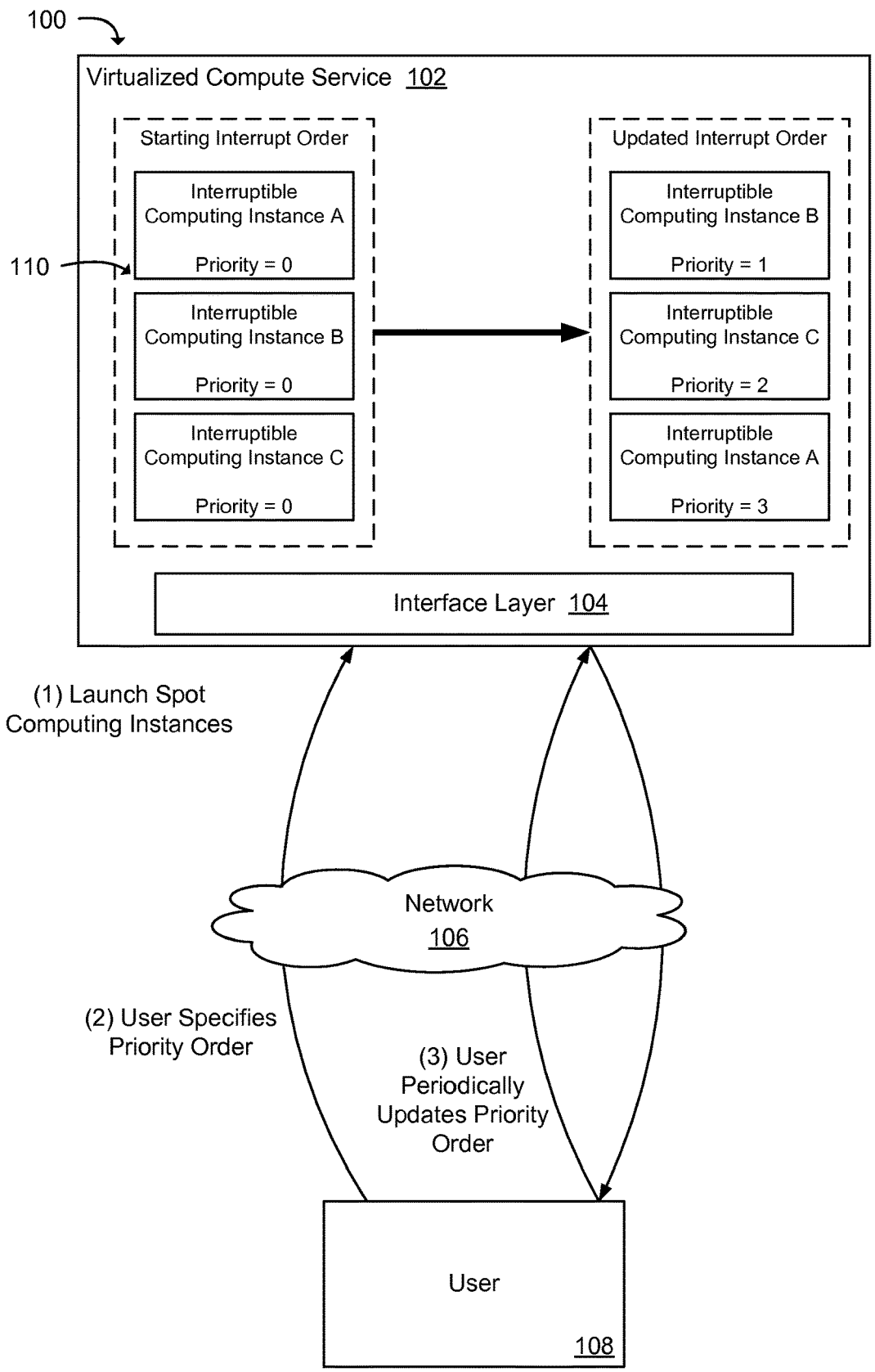
FIG. 1 is a diagram illustrating an example system and method for prioritizing interruptible computing instances.

A technology is described for establishing an order in which interruptible computing instances are interrupted within a virtualized computing service by prioritizing the interruptible computing instances. An interruptible computing instance may be a virtual computing instance provided by a service provider who may interrupt the virtual computing instance upon an occurrence of some constraint. For example, an interruptible computing instance may be interrupted when a price increases above a bid for the interruptible computing instance or when a capacity constraint may be encountered. Interruption of a computing instance may include terminating the computing instance, terminating the computing instance on a first server and re-launching the computing instance on a second server or migrating the computing instance from a first server to a second server without disconnecting a user and any applications.

Interruptible computing instances can be prioritized such that when an interruptible computing instance must be interrupted, an interruptible computing instance having the lowest priority as compared to other interruptible computing instance priorities may be selected for interruption. A priority assigned to an interruptible computing instance may represent a value of a task being performed by an interruptible computing instance as determined by a user, customer or system.

In one example configuration, a request may be received calling for one or more interruptible computing instances to be selected from a group of executing interruptible computing instances for interruption. Interruptible computing instances included in the group may be associated with a user or customer who may have bid the same bid for each of the interruptible computing instances. A bid may be a maximum price offered by the user to utilize the interruptible computing instances. The group of interruptible computing instances may be prioritized using assigned instance priority values that establish an order in which the interruptible computing instances may be interrupted. After receiving a request to interrupt one or more interruptible computing instances, those interruptible computing instances having a lower instance priority value as compared to other instance priority values assigned to the plurality of interruptible computing instances may be identified and selected for interruption.

In one example, upon launching a group of interruptible computing instances, system assigned instance priority values may be assigned to the interruptible computing instances where the system assigned instance priority values may be the same for each interruptible computing instance in the group. A user may then provide updated instance priority values for the group of interruptible computing instances via a user interface that may include a graphical user interface or a programmatic interface. Alternatively, a user may submit instance priority values for a group of interruptible computing instances prior to launching the interruptible computing instances and then update the interruptible computing instances periodically. In another example, a user may provide user defined rules that may be used by a system to determine instance priority values for a group of interruptible computing instances. In yet another example, instance priority values for a user's interruptible computing instances that have the same bid may be determined using system defined rules.

Interruptible computing instances may be grouped based on one or more attributes, for example, and the grouping of an interruptible computing instances may then be prioritized. For example, a user account may be used to group interruptible computing instances and the group of interruptible computing instances may then be prioritized. In one example, a user may create a group of interruptible computing instances and then prioritize the group of interruptible computing instances.

A user that submits the same bid for a number of interruptible computing instances has the risk that once the bids are accepted and the interruptible computing instances are launched, the user's interruptible computing instances may be interrupted in any random order when a request to terminate an interruptible computing instance is received. As an illustration, a user may place a bid on three interruptible computing instances. The bid may be accepted and the three interruptible computing instances may be launched. After a period of time, the price may increase making the user's three interruptible computing instances subject to interruption. Because the three interruptible computing instances are not prioritized, any of the interruptible computing instances may be interrupted regardless of whether or not one of the interruptible computing instances may be near completion of a job as compared to the other two interruptible computing instances. A user who specifies a priority order in which interruptible computing instances are interrupted may avoid the above illustration.

FIG. 1 is a diagram illustrating a high level example of a system and method 100 for prioritizing a number of interruptible computing instances 110. The system may include a virtualized compute service 102 executing a number of interruptible computing instances 110 that a user 108 may utilize for various interruption tolerant tasks (e.g., optional computing tasks, delayable tasks, tasks that may be boosted with additional computing resources, etc.). The virtualized compute service 102 may include an interface layer 104 that exposes an API (Application Programming Interface) or other interface to a number of client devices. A user 108 may access the interface layer 104 via a client device over a communications network 106.

In this example, a user 108 may submit a bid for a number of interruptible computing instances 110. The interruptible computing instances 110 may be launched upon a price being equal or below the bid submitted by the user 108. When launching the interruptible computing instances 110, a default initial instance priority value may be assigned to each of the interruptible computing instances 110. The initial instance priority value may be the same for each of the interruptible computing instances 110. As a specific example, the initial instance priority value assigned to the interruptible computing instances 110 may be zero, thereby making the interruptible computing instances 110 equally subject to being interrupted.

After a period of time, the user 108 may evaluate the interruptible computing instances 110 to determine the progress of each interruptible computing instance 110 in accomplishing a task. As an illustration, a first interruptible computing instance (e.g., interruptible computing instance B) may be 90% complete in performing a first task, a second interruptible computing instance (e.g., interruptible computing instance C) may be 50% complete in performing a second task and a third interruptible computing instance (e.g., interruptible computing instance A) may be 20% complete in performing a third task. Because the interruptible computing instances 110 have an initial instance priority value that is the same for each interruptible computing instance 110, any of the interruptible computing instances 110 may be at risk of being interrupted regardless of an amount of work accomplished by an interruptible computing instance. As a result, the user 108 may wish to assign instance priority values to the interruptible computing instance 110 thereby specifying an order in which the interruptible computing instances 110 are to be interrupted. Continuing the above illustration, the user 108 may wish to assign the first interruptible computing instance that has completed 90% of a first task a top instance priority value because the first interruptible computing instance may be nearly finished completing the first task. The user's other interruptible computing instances (i.e., the second interruptible computing instance and the third interruptible computing instance) may be assigned lower instance priority values than the first interruptible computing instance based in part on an amount of work accomplished by the other interruptible computing instances toward completing the interruptible computing instance's respective tasks.

A user 108 may wish to periodically update the instance priority values assigned to the interruptible computing instances 110. By periodically updating the instance priority values, a user 108 may re-adjust the interrupt order of the interruptible computing instances 110 as execution conditions of the interruptible computing instances 110 change. Continuing the above illustration, over time, a first interruptible computing instance having an assigned top instance priority value may stall in completing a first task allowing a second interruptible computing instance to surpass the first interruptible computing instance in the percentage of work performed towards completing a task. As a result, a user 108 may desire to update the instance priority value of the second interruptible computing instance with a top instance priority value in the hope that the second interruptible computing instance may complete the task prior to being interrupted. As another illustration, after a period of time, a user 108 may observe that a first interruptible computing instance having an assigned top instance priority value may have completed a first task and has started a second task. A second interruptible computing instance may still be working on a task that may be 95% complete. As a result, the user 108 may wish to update the instance priority value of the second interruptible computing instance with a top instance priority value and reduce the priority of the first interruptible computing instance.

Conditions upon which a user 108 bases an assigned instance priority value are not limited to the above illustrations. Rather, a user 108 may base an instance priority value on any logic as determined by the user 108. Examples of conditions that a user 108 may consider when assigning a instance priority value to a interruptible computing instance 110 may include, but are not limited to, assigning a instance priority value based in part on an execution time of a interruptible computing instance 110 that has accrued since the launch of the interruptible computing instance 110, assigning a instance priority value based in part on an execution time of a task being performed by a interruptible computing instance 110, assigning a instance priority value based in part on CPU utilization of a interruptible computing instance 110, assigning a instance priority value based in part on a number of connections between a interruptible computing instance 110 and other virtualized computing service components, assigning a instance priority value based in part on an amount of data being utilized by a interruptible computing instance 110 or assigning a instance priority value based in part on task metadata associated with a interruptible computing instance 110.

Figure 2:
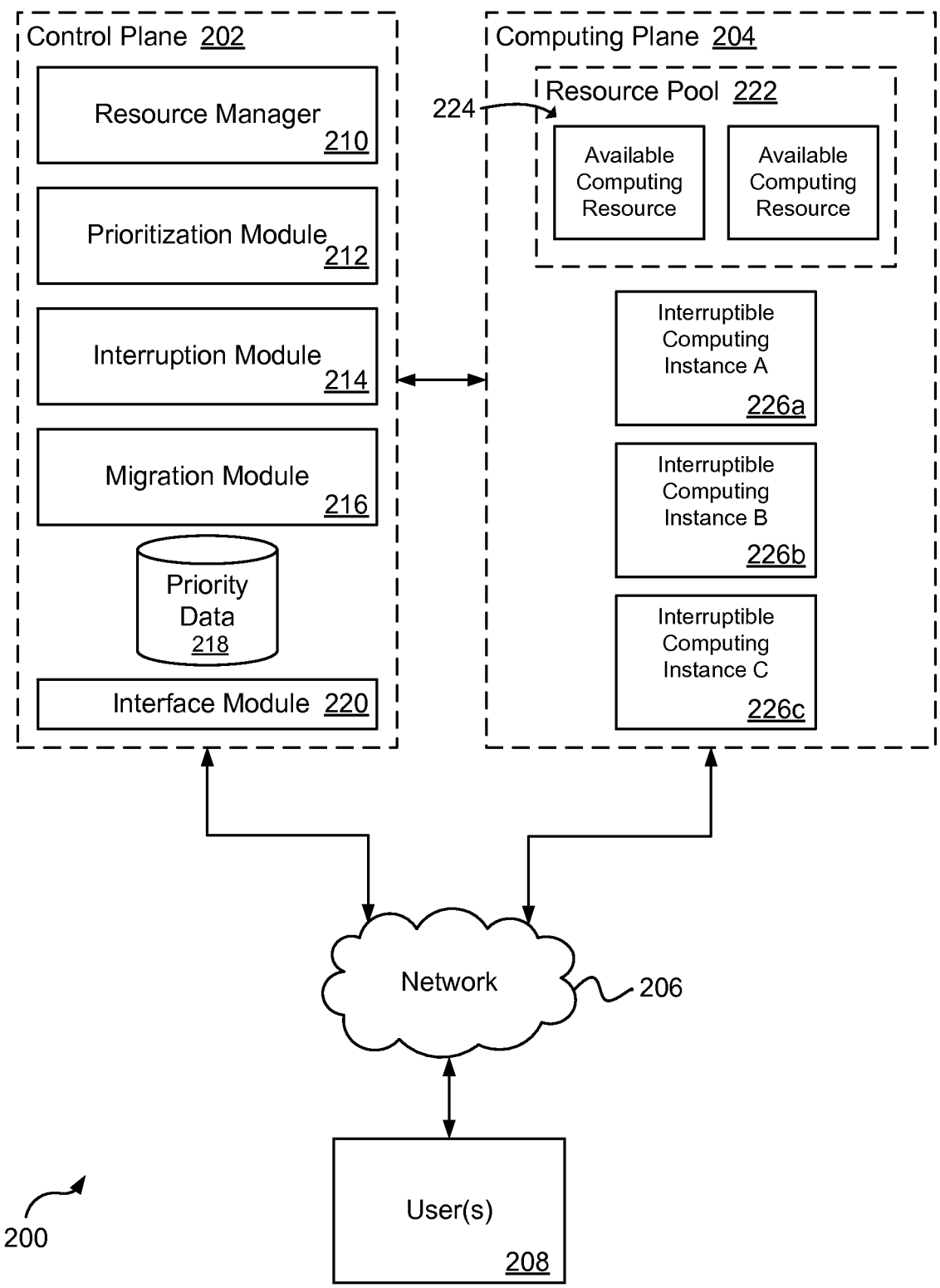
FIG. 2 is a block diagram illustrating an example system for prioritizing a plurality of interruptible computing instances.

FIG. 2 illustrates components of an example system environment 200 on which the present technology may be executed. The system environment 200 may include a computing plane 204 that includes available computing resources 224 and a number of executing virtual computing instances. An available computing resource 224 may be computing hardware that may be used to execute a virtual computing instance. Available computing resources 224 may be made available to users 208 who may then utilize the available computing resources 224 to execute one or more virtual computing instance types. For example, virtual computing instance types may include on-demand computing instances, reserved computing instances and interruptible computing instances. An on-demand computing instance may be a computing instance that a user 208 may purchase and execute upon request. A reserved computing instance may be a virtual computing instance that a user 208 may purchase for a defined period of time making the virtual computing instance available when the user 208 requests the virtual computing instance. An interruptible computing instance 226a-c may be a virtual computing instance (e.g., available computing resource 224) that may not be currently used by an on-demand computing instance user or a reserved computing instance user. Available computing resources 224 that may be available to users 208 wishing to purchase a interruptible computing instance 226a-c may be included in a resource pool 222 managed by a resource manager 210, which may provision available computing resources 224 from the resource pool 222 upon request.

The system environment 200 may also include a control plane 202 that may receive management requests, configuration requests or other such requests relating to a virtualized computing service. In this example, the control plane 202 may include a data store containing priority data 218 for a number of interruptible computing instances 226a-c, a resource manager 210, a prioritization module 212, an interruption module 214, a migration module 216 as well as other services, processes, systems, engines, or functionality not discussed in detail herein. A web services layer, or tier, may include at least one server, for example, along with computer executable software, application servers, and/or other such components that expose a set of APIs (or other such interfaces) for receiving web service calls or other such requests from across the network 206. In this example, a web services layer may include an interface module 220 that may be configured to expose an API to receive instance priority values that are associated with a plurality of interruptible computing instances 226a-c.

The prioritization module 212, in one example, may be configured to receive and/or assign instance priority values to a set of interruptible computing instances 226a-c belonging to a user 208, where the interruptible computing instances 226a-c have the same bid. The instance priority values may establish an order in which the set of interruptible computing instances may be interrupted when a request to reclaim an interruptible computing instance 226a-c may be received. For example, an instance priority value may indicate that an interruptible computing instance 226a-c may have a high priority, low priority or some level of priority in-between high and low. As such, instance priority values may provide an order of interruption for a set of interruptible computing instances 226a-c. An instance priority value may be a numerical value, an alphabetical value, a descriptive indicator (e.g., "high", "intermediate", "low", etc.) or any other relative designation that may be used to indicate a level of priority.

In one example configuration of the prioritization module 212, instance priority values may be received from a user 208 who may assign a instance priority value to one or more interruptible computing instances 226a-c owned by the user 208. A user 208 may provide instance priority values via an interface module 220, such as an electronic page containing a graphical user interface, a client side application in communication directed to the prioritization module 212, a command control interface, or any other type of user interface. The instance priority values may then be associated with a respective interruptible computing instance 226a-c and stored in a data store (e.g., priority data 218) accessible to the prioritization module 212. The data store, in one example, may be a database used to organize and manage associated instance priority values and a number of executing interruptible computing instances 226a-c.

In one example, upon launching a set of interruptible computing instances 226a-c, an initial instance priority value may be assigned to the interruptible computing instance 226a-c. The initial instance priority values assigned to the interruptible computing instance 226a-c may be the same for the interruptible computing instances 226a-c within the set, making the interruptible computing instances 226a-c equally subject to interruption. Later, a user 208 may provide instance priority values for the executing set of interruptible computing instances 226a-c to the prioritization module 212, whereupon the user specified instance priority values may be associated with the respective interruptible computing instances 226a-c. The user 208 may periodically update the instance priority values as conditions change within the set of interruptible computing instances 226a-c.

In another example, after launching a set of interruptible computing instances 226a-c, the prioritization module 212 may be used to prompt a user 208 to provide instance priority values for the set of executing interruptible computing instances 226a-c. As an illustration, a period of time after launching the set of interruptible computing instances 226a-c, a request may be sent to the user's 208 client device requesting that instance priority values be provided for the set of executing interruptible computing instances 226a-c.

In another example configuration of the prioritization module 212, instance priority values may be determined using the prioritization module 212 and a set of defined rules. Defined rules may be provided by a user 208 or may be system defined rules. In one example, a defined rule for determining an instance priority value for an interruptible computing instance 226a-c may include quantifying at least one attribute associated with an interruptible computing instance 226a-c and using the attribute to generate a priority. Examples of attributes that may be quantified may include, but are not limited to, an accrued execution time attribute, a job execution time attribute, CPU utilization attribute, a number of active connections attribute, a data utilization attribute, job metadata attributes and the like. Any quantifiable attribute associated with an interruptible computing instance 226a-c may be used in determining an instance priority value for an interruptible computing instance 226a-c. Examples of prioritizing interruptible computing instances 226a-c using a set of defined rules are provided later in relation to FIG. 6 and FIG. 7.

The interruption module 214 may be configured to identify at least one interruptible computing instance 226a-c in a set of a user's interruptible computing instances 226a-c to interrupt based in part on instance priority values assigned to the interruptible computing instances 226a-c. As an illustration, when the computing plane is being requested to provide computing resources for on-demand virtual computing instances or reservations for virtual computing instances, a request to interrupt an interruptible computing instance 226a-c may be generated and priority data 218 for a user's interruptible computing instances 226a-c may be retrieved from a data store 218. From the priority data 218 retrieved, the instance priority value having the lowest value may be identified and an interruptible computing instance associated with the identified instance priority value may then be interrupted.

The migration module 216 may be used to migrate an executing interruptible computing instance 226a-c from a first physical computing device to a second physical computing device in the physical substrate supporting the computing plane 204 when the first physical computing device is reclaimed for another computing instance 224. Migrating an executing interruptible computing instance may be performed in order to honor a priority order established by a user 208. For instance, a user may assign an interruptible computing instance of a specific type (e.g., memory optimized) a high instance priority value. A request to interrupt may then be received requesting the memory optimized interruptible computing instance. Instead of interrupting the high priority interruptible computing instance, the interruptible computing instance may be live migrated from the server that is executing the interruptible computing instance to another server that has available computing resources on which the interruptible computing instance may be executed.

A user 208 may utilize a client device that may include any device capable of sending and receiving data over a network 206. A client device may comprise, for example a processor-based system such as a computing device. A client device may be a device such as, but not limited to, a desktop computer, laptop or notebook computer, tablet computer, mainframe computer system, handheld computer, workstation, network computer, or other devices with like capability. An application installed on a client device may allow a user 208 to communicate with a control plane 202. Likewise, a browser may enable the client device to communicate with the control plane 202 by way of a server side executed web application.

The various processes and/or other functionality contained within the system environment 200 may be executed on one or more processors that are in communication with one or more memory modules. The system environment 200 may include a number of computing devices that are arranged, for example, in one or more server banks or computer banks or other arrangements. The computing devices may support a virtualized computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 206 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
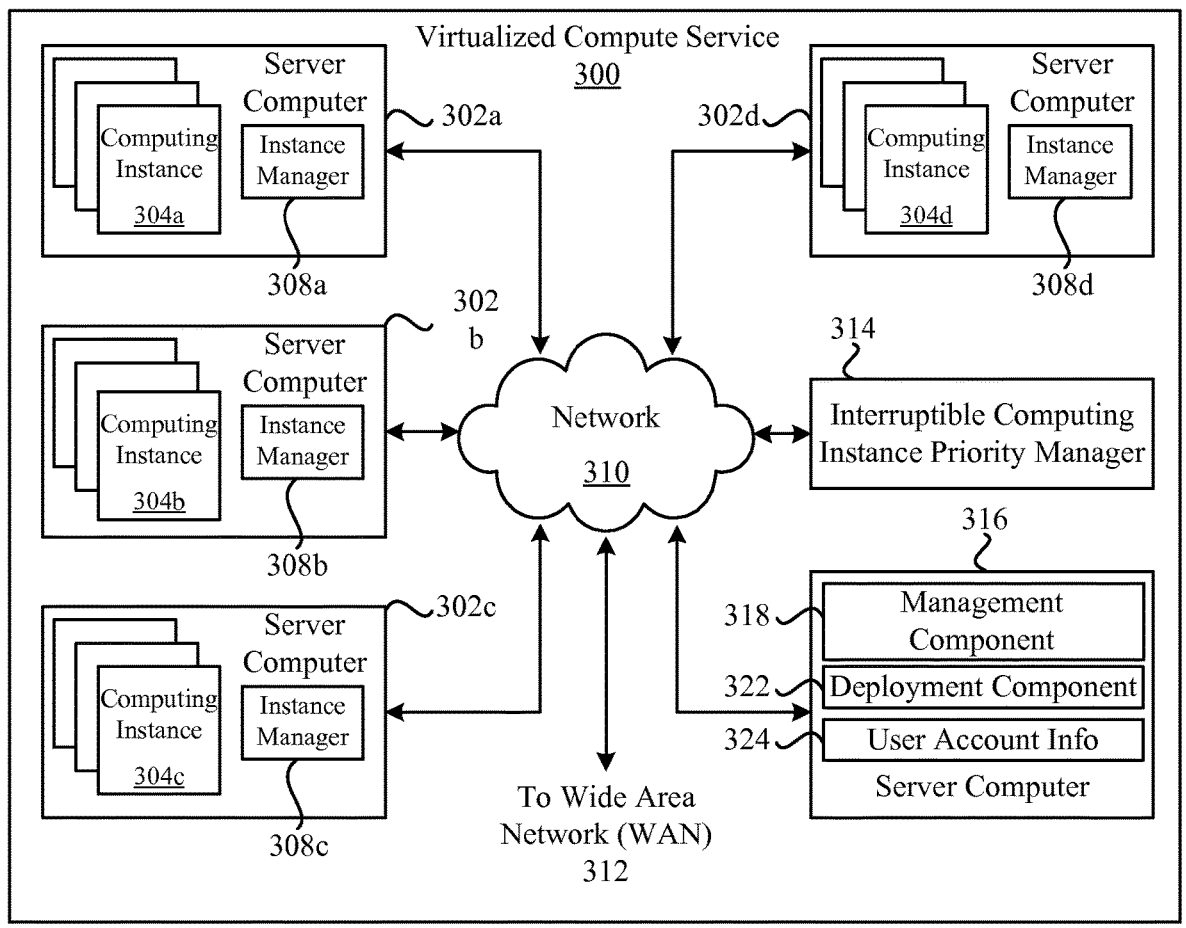
FIG. 3 is a block diagram that illustrates an example virtualized compute service that includes interruptible computing instances that can be prioritized.

FIG. 3 is a block diagram illustrating an example virtualized compute service 300 that may be used to execute and manage a number of prioritized interruptible computing instances 304a-d. In particular, the virtualized compute service 300 depicted illustrates one environment in which the technology described herein may be used. The virtualized compute service 300 is one type of environment that includes various virtualized service resources that may be used, for instance, to host interruptible computing instances 304a-d.

The virtualized compute service 300 may be capable of delivery of computing and storage capacity as a software service to a community of end recipients. In one example, the virtualized compute service 300 may be established for an organization by or on behalf of the organization. That is, the virtualized compute service 300 may offer a "private cloud environment." In another example, the virtualized compute service 300 may support a multi-tenant environment, wherein a plurality of users may operate independently (i.e., a public cloud environment). Generally speaking, the virtualized compute service 300 may provide the following models: Infrastructure as a Service ("IaaS"), Platform as a Service ("PaaS"), and/or Software as a Service ("SaaS"). Other models may be provided. For the IaaS model, the virtualized compute service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the virtualized compute service platform without incurring the cost of buying and managing the underlying hardware and software. The SaaS model allows installation and operation of application software in the virtualized compute service 300. End users may access the virtualized compute service 300 using networked client devices, such as desktop computers, laptops, tablets, smartphones, etc running web browsers or other lightweight client applications, for example. Those familiar with the art will recognize that the virtualized compute service 300 may be described as a "cloud" environment.

The particularly illustrated virtualized compute service 300 may include a plurality of server computers 302a-d. While four server computers are shown, any number may be used, and large centers may include thousands of server computers. The virtualized compute service 300 may provide computing resources for executing interruptible computing instances 304a-d. Interruptible computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple interruptible computing instances 304a-d on a single server. Additionally, each of the interruptible computing instances 304a-d may be configured to execute one or more applications.

One or more server computers 314 and 316 may be reserved to execute software components for managing the operation of the virtualized compute service 300 and the interruptible computing instances 304a-d. For example, a server computer 314 may execute an interruptible computing instance priority manager that may perform functions, such as assigning or determining priorities for a plurality of interruptible computing instances 304a-d, as well as identifying an interruptible computing instance 304a-d having the lowest priority to interrupt. In addition, a server computer 316 may execute a management component 318. A user may access the management component 318 to configure various aspects of the operation of the interruptible computing instances 304a-d purchased by the user. For example, the user may setup interruptible computing instances 304a-d and make changes to the configuration of the interruptible computing instances 304a-d.

A deployment component 322 may be used to assist users in the deployment of interruptible computing instances 304a-d. The deployment component 322 may have access to account information associated with the interruptible computing instances 304a-d, such as the name of an owner of the account, credit card information, country of the owner, etc. The deployment component 322 may receive a configuration from a user that includes data describing how interruptible computing instances 304a-d may be configured. For example, the configuration may specify an operating system, provide one or more applications to be installed in interruptible computing instances 304a-d, provide scripts and/or other types of code to be executed for configuring interruptible computing instances 304a-d, provide cache logic specifying how an application cache should be prepared, and other types of information. The deployment component 322 may utilize the user-provided configuration and cache logic to configure, prime, and launch interruptible computing instances 304a-d. The configuration, cache logic, and other information may be specified by a user accessing the management component 318 or by providing this information directly to the deployment component 322.

User account information 324 may include any desired information associated with a user of the multi-tenant environment. For example, the user account information may include a unique identifier for a user, a user address, billing information, licensing information, customization parameters for launching instances, scheduling information, etc. As described above, the user account information 324 may also include security information used in encryption of asynchronous responses to API requests. By "asynchronous" it is meant that the API response may be made at any time after the initial request and with a different network connection.

A network 310 may be utilized to interconnect the virtualized compute service 300 and the server computers 302a-d, 316. The network 310 may be a local area network (LAN) and may be connected to a Wide Area Network (WAN) 312 or the internet, so that end users may access the virtualized compute service 300. It should be appreciated that the network topology illustrated in FIG. 3 has been simplified and that many more networks and networking devices may be utilized to interconnect the various computing systems disclosed herein.

Figure 4:
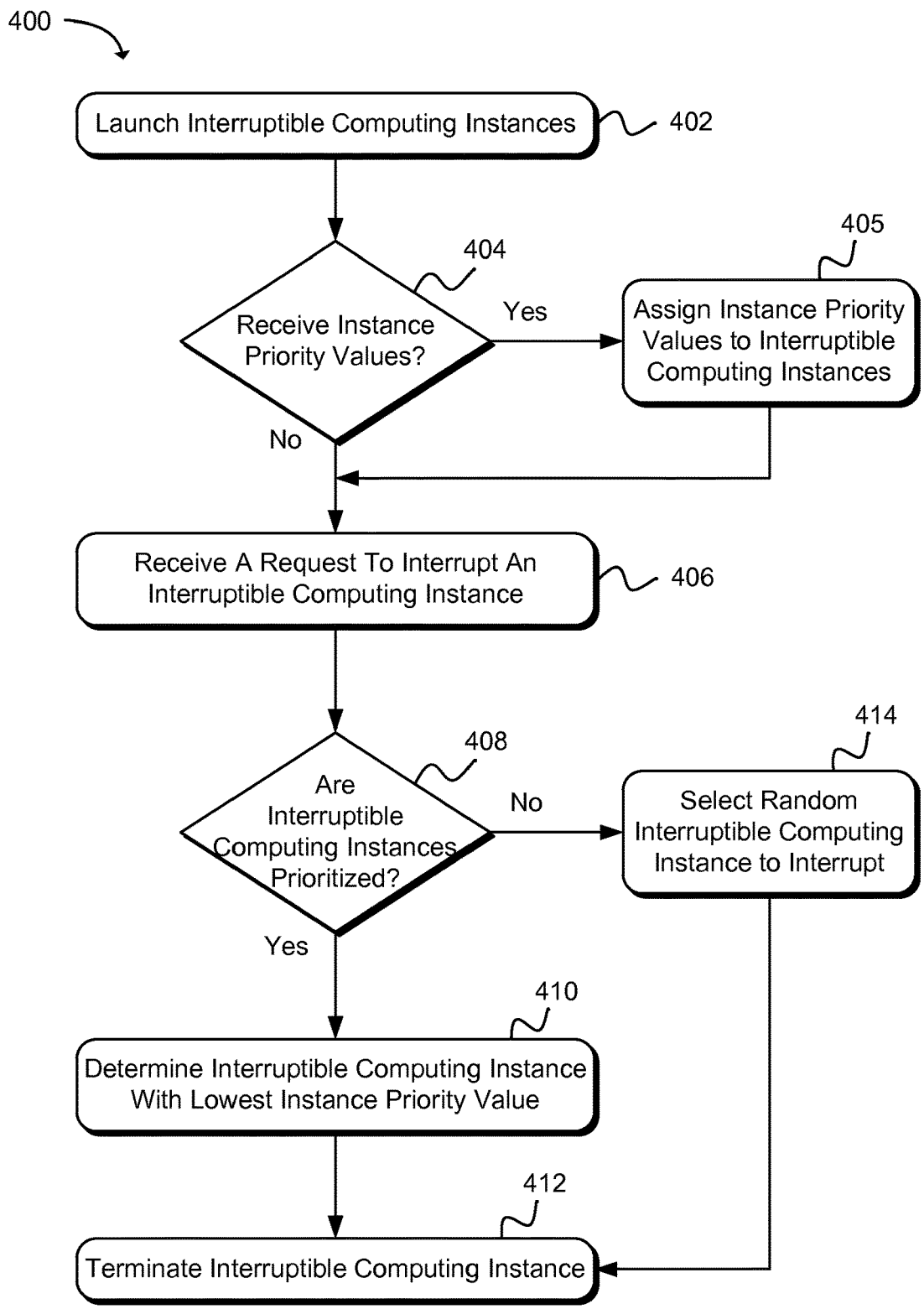
FIG. 4 is a flow diagram illustrating an example method for selecting an interruptible computing instance for interruption.

Moving now to FIG. 4, a flow diagram illustrates an example method 400 for prioritizing a set of interruptible computing instances. Beginning in block 402, a number of interruptible computing instances may be launched within a virtualized compute service. The interruptible computing instances may be owned by a user who may have offered a bid for the interruptible computing instances. The bid offered by the user may be the same for the interruptible computing instances launched. Whether the interruptible computing instances launch at the time a bid may be accepted may depend upon whether a sufficient number of computing instances may be available.

After the interruptible computing instances have been launched, as in block 404, instance priority values for the interruptible computing instances may be received and, as in block 405, assigned to the interruptible computing instances. In one example configuration, an initial instance priority value may be assigned to the interruptible computing instances. In another example, the initial instance priority value may be the same for each interruptible computing instance. For example, where all interruptible computing instances launch simultaneously, each interruptible computing instance may be assigned an identical instance priority value. In a case where not all of the interruptible computing instances launch simultaneously, the same instance priority value may be assigned to an interruptible computing instance when the interruptible computing instance launches. In another example, an initial instance priority value may be determined by an order in which an interruptible computing instance is launched. For example, upon launching a first interruptible computing instance, a high instance priority value may be assigned to the first interruptible computing instance and other interruptible computing instances subsequently launched may receive a lower instance priority value as compared to the instance priority value of the first interruptible computing instance. In yet another example, the user may assign an initial instance priority value to an interruptible computing instance prior to, or at the time the interruptible computing instance is launched.

After the interruptible computing instances have been executing for a period of time, a user may evaluate the interruptible computing instances and determine instance priority values for the interruptible computing instances. In one example configuration, a user may provide the instance priority values by assigning an instance priority value to each interruptible computing instance, whereupon the instance priority values may be submitted to a bid priority manager that may associate a user specified instance priority value with a particular executing interruptible computing instance. The instance priority values may range from a high (top) priority to a low (bottom) priority. For example, a high instance priority value assigned to an interruptible computing instance may indicate a preference that other interruptible computing instances with lower instance priority values be interrupted prior to interrupting the interruptible computing instance with the high instance priority value. In another example, a user may submit one or more user defined rules for determining a instance priority value for the interruptible computing instances where the defined rules specify at least one attribute associated with a interruptible computing instance that is quantified in order to determine the instance priority value, as will be discussed in further detail in relation to FIG. 6. In yet another example, system rules may be used to determine an instance priority value for an interruptible computing instance, as will be further detailed in relation to FIG. 7.

As in block 406, a request may be received to interrupt one or more executing interruptible computing instances. Because an executing interruptible computing instance may comprise computing capacity not currently utilized as an on-demand virtual computing instance or reserved virtual computing instance, the computing resources used to execute an interruptible computing instance may be reclaimed at any time. In one example, when reclaiming computing capacity, an interruption request may necessitate that a number of interruptible computing instances be interrupted so that the computing capacity used to execute the interruptible computing instances can be re-purposed to another activity (e.g., to an on-demand computing instance(s) or a reserved computing instance(s)).

In determining which interruptible computing instance to interrupt, as in block 408, a determination may first be made whether the executing interruptible computing instances subject to termination are prioritized. In a case were the interruptible computing instances may not be prioritized, as in block 414, a random interruptible computing instance may be selected to interrupt. In a case where the interruptible computing instance may be prioritized, as in block 410, an interruptible computing instance having the lowest instance priority value as compared to other interruptible computing instance priority values may be identified. Various methods of prioritization may be used and are within the scope of this disclosure. As a specific example, interruptible computing instances may be prioritized based on a numeric instance priority value. The interruptible computing instances may be ordered according to an assigned numeric instance priority value, thereby establishing an interruption order. As can be appreciated, a numeric instance priority value may be used to indicate a high or low priority based on an implementation preference. For example, a high numeric value may indicate a high priority and a low numeric value may indicate a low priority. In another example, a low numeric value may indicate a high priority and a high numeric value may indicate a low instance priority value. The numeric instance priority values may be ordered in an ascending or descending order based on the implementation preference selected and, in one example, may be used to create a queue or a stack. When an interruption request is received, an interruptible computing instance in the first position of the queue or the top position of the stack may be identified as the interruptible computing instance that will be interrupted.

As another specific example, a priority label may be assigned to interruptible computing instances. For example, the label "high" may be assigned to one or more interruptible computing instances having a high priority, the label "medium" may be assigned to interruptible computing instances having a medium priority and the label "low" may be assigned to interruptible computing instance having a low priority. In a case where more than one interruptible computing instance is assigned a particular label, for example, all interruptible computing instances having the label may be equally subject to termination. Having identified one or more interruptible computing instances for interruption, as in block 412, the interruptible computing instances may then be interrupted (terminated) and the computing resources used to execute the interrupted interruptible computing instances may be reclaimed for another purpose.

Figure 5:
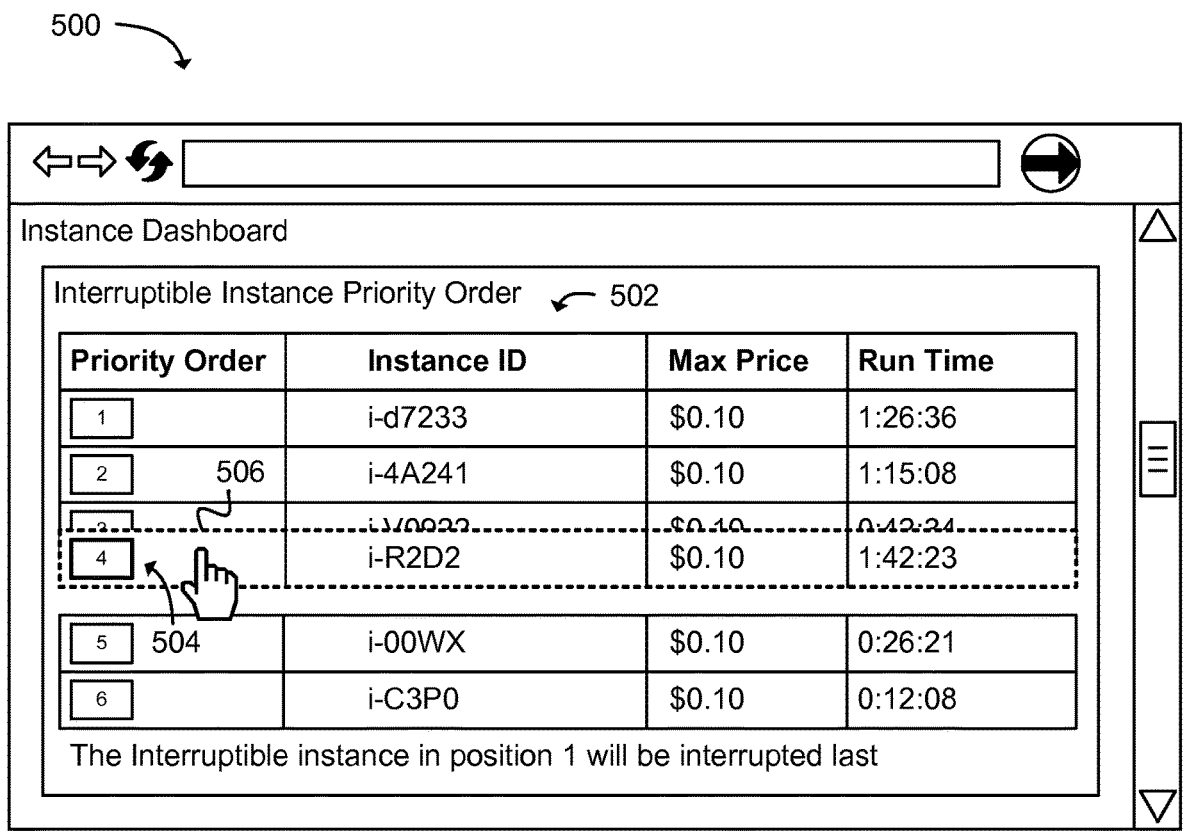
FIG. 5 is a diagram that illustrates an example graphical user interface that can be used to prioritize interruptible computing instances.

FIG. 5 is a diagram illustrating one example of a graphical user interface 500 displaying a list of interruptible computing instances with associated priority fields 504 in which a user may specify an instance priority value for an interruptible computing instance. In one example configuration, the graphical user interface 500 may include a table 502 containing a number of rows 506 having information for interruptible computing instances owned by a user. A row 506 may include information that identifies an interruptible computing instance and a priority field 504 that may be used to prioritize or order the user's interruptible computing instances. In the example illustrated in FIG. 5, a user may assign an interruptible computing instance a numeric value by entering the numeric value in the priority field 504. The interruptible computing instances in the table 502 may be prioritized such that an interruptible computing instance assigned an instance priority value of "1" may be the last interruptible computing instance to be interrupted. Any method of prioritization may be employed using the priority fields 504.

In addition to assigning a instance priority value to a interruptible computing instance via a priority field 504, in one example, rows within the table 502 may be reordered via a drag and drop function provided by the graphical user interface 500. Reordering a row 506 may modify the priority order of the table 502. For example, moving a row 506 up or down in the table 502 may affect the instance priority value of rows above or beneath the row 506. As an illustration, using a drag and drop function, a row 506 may be moved from a fourth position from the top of a table 502 to a third position from the top of the table 502. As a result, the instance priority value assigned to an interruptible computing instance associated with the row 506 may be updated from "4" to "3" as a result of moving the row 506 up one position in the table 502. A priority field for the row displaced as a result of moving the row 506 up one position may be updated with a instance priority value equal to the row's position in the table 502 (e.g., from "3" to "4").

Figure 6:
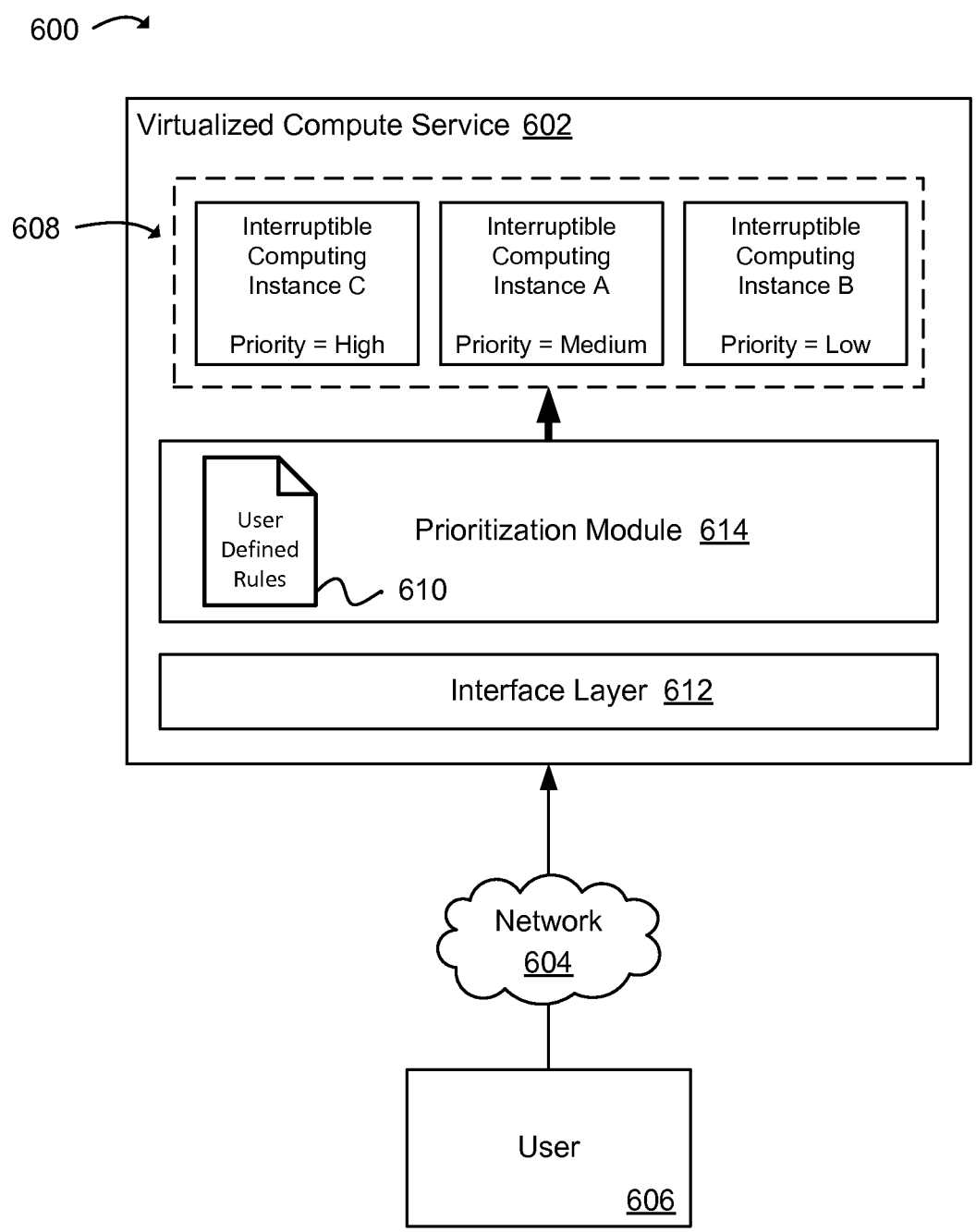
FIG. 6 is a block diagram illustrating an example system for prioritizing interruptible computing instances utilizing user defined rules.

FIG. 6 is a block diagram illustrating an example system 600 for prioritizing interruptible computing instances 608 using defined rules or methods provided by a user. The system 600 may include a virtualized compute service 602 executing a number of interruptible computing instances 608. A user 606 may access the virtualized compute service 602 via an API, procedure call or other such interface of an interface layer 612 using a client device. The client device may be in communication with the virtualized compute service 602 by way of at least one network 604.

The user 606 may provide one or more user defined rules 610 that may be used to prioritize a number of interruptible computing instances 608 owned by the user 606. A bid for the interruptible computing instances 608 may be the same bid amount for each of the interruptible computing instances 608 making the interruptible computing instances 608 subject to being interrupted in a random order. The user may define at least one rule that may be used to evaluate at least one attribute of an interruptible computing instance 608 and determine an instance priority value for the interruptible computing instance 608.

After a user has created one or more user defined rules 610, the user 606, in one example, may submit the user defined rules 610 to a prioritization module 614 via the interface layer 612. The prioritization module 614 may then apply the user defined rules 610 in order to evaluate the user's executing interruptible computing instances 608 having identical bids and assign instance priority values to the interruptible computing instances based on the user defined rules 610. Alternatively, a graphical user interface may be provided to a user 606 which may include a rule builder tool that the user 606 may use to construct one or more user defined rules 610 and submit the user defined rules 610 to the prioritization module 614. The prioritization module 614 may periodically evaluate the user's executing interruptible computing instances 608 and update associated instance priority values as may be warranted.

The following are examples of user defined rules 610 that may be provided by a user 606. In one example, an instance priority value may be based in part on an execution time of an interruptible computing instance 608 that has accrued since the launch of the interruptible computing instance. For example, a longer execution time for an interruptible computing instance 608 that has accrued since launching the interruptible computing instance 608 as compared to execution times for other interruptible computing instances 608 since launching the other interruptible computing instances 608 may warrant a higher priority for the interruptible computing instance 608.

In a second example, an instance priority value may be based in part on an execution time of a job being performed by an interruptible computing instance. A job may be a task being performed by an interruptible computing instance 608. An interruptible computing instance 608 may perform multiple jobs during the lifetime of the interruptible computing instance 608. In a case where a job execution time for an interruptible computing instance 608 may be longer as compared to job execution times of other interruptible computing instances 608, a higher priority may be assigned to the interruptible computing instance 608 with the longest execution time.

In a third example, an instance priority value may be assigned based in part on CPU (Central Processing Unit) utilization by an interruptible computing instance 608. CPU utilization may refer to a level of CPU throughput attributed to an interruptible computing instance 608. A level of CPU throughput by an interruptible computing instance 608 may be an indication of an amount of work and/or complexity of work being performed by the interruptible computing instance 608. Interruptible computing instances 608 having a high level of CPU utilization may warrant a higher instance priority value as compared to other interruptible computing instances 608 having a lower level of CPU utilization based on the indication of work being performed by the interruptible computing instance 608.

In a forth example, a instance priority value may be based in part on a number of connections between a interruptible computing instance 608 and other virtual computing service components. Virtual computing components might include memory modules, processors, data stores, networks, computing instances, etc. A greater number of connections between an interruptible computing instance 608 and various virtual computing services may be an indication of an amount of work being performed by the interruptible computing instance 608. As such, an interruptible computing instance having a greater number of connections to virtual computing service components as compared to other interruptible computing instances 608 may be assigned a higher instance priority value.

In a fifth example of a user defined rule 610, an instance priority value may be based in part on an amount of data being utilized by an interruptible computing instance. For example, utilization of a large amount of data by an interruptible computing instance 608 may be an indication that the interruptible computing instance 608 is performing data intensive work that may be lost as a result of the interruptible computing instance 608 being interrupted. The amount of data being utilized by an interruptible computing instance 608 may be measured and compared to an amount of data being utilized by other interruptible computing instances 608. Interruptible computing instances 608 utilizing the greatest amount of data may be assigned higher instance priority values as compared to interruptible computing instances 608 using a lesser amount of data.

In a sixth example of a user defined rule 610, a instance priority value may be assigned to a interruptible computing instance 608 based in part on job metadata associated with the interruptible computing instance 608. Job metadata may be information about a task being performed by an interruptible computing instance 608. The metadata may include any information associated with a job or job type being performed by the interruptible computing instance 608. As one example, metadata that identifies a job by name may be used to identify a job that may be of high importance to a user 606. For instance, the user 606 may submit a user defined rule 610 specifying that an interruptible computing instance 608 executing a job having a particular job name be assigned a high instance priority value.

Figure 7:
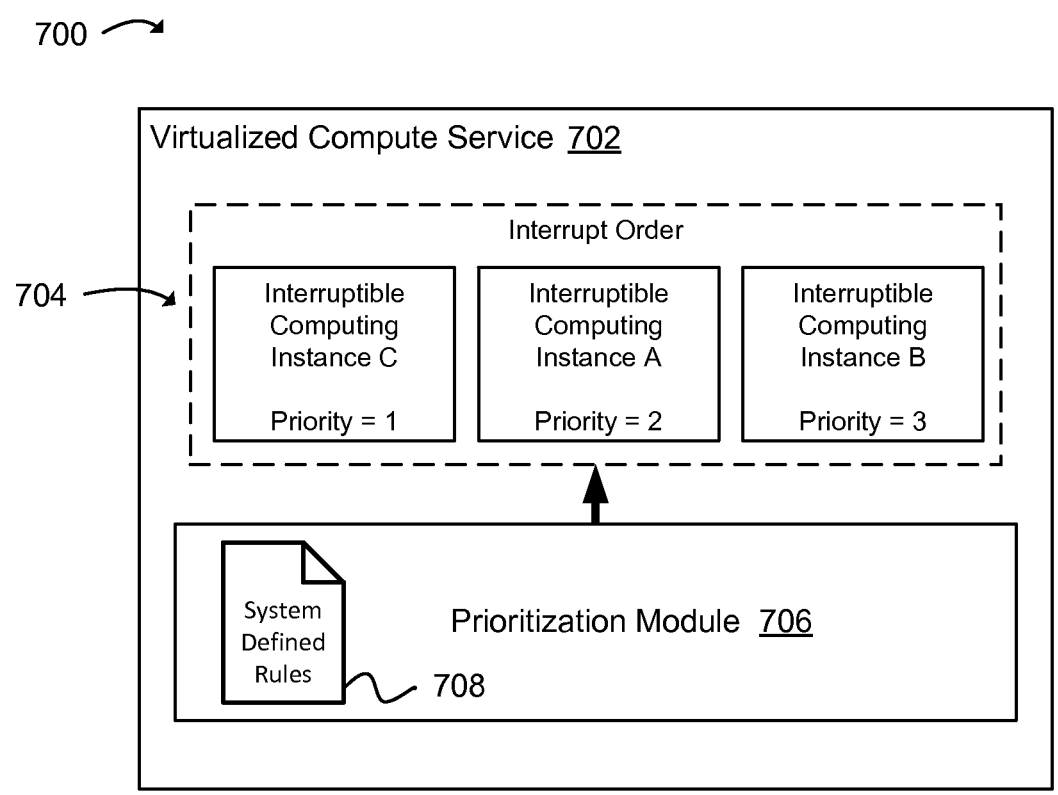
FIG. 7 is a block diagram illustrating an example system for prioritizing interruptible computing instances using system defined rules.

FIG. 7 is a block diagram illustrating an example system 700 for prioritizing interruptible computing instances 704 having a same bid amount using system defined rules. The system 700 may include a virtualized compute service 702 executing a number of interruptible computing instances 704 owned by a user. Also included in the system 700 may be a prioritization module 706 used to evaluate the user's interruptible computing instances 704 and assign instance priority values to the interruptible computing instances 704. A system defined rule 708 may specify at least one attribute associated with an interruptible computing instance 704 that may be quantified in order to determine an instance priority value. A system defined rule 708 may be used to prioritize a user's interruptible computing instances 704. For example, a user may wish not to prioritize the user's interruptible computing instances 704 and elect instead to have a prioritization module 706 prioritize the user's interruptible computing instances 704 based on system defined rules 708.

In one example configuration, a number of system defined rules 708 may be accessible to the prioritization module 706. A system defined rule 708 may specify an attribute for an interruptible computing instance 704 that may be quantified. Example attributes may include, but are not limited to, an accrued execution time attribute, a job execution time attribute, a CPU utilization attribute, a number of connections attribute, an data utilization attribute, a geographic area location attribute, an availability zone location attribute, job metadata attributes, etc. Examples of system defined rules 708 may include, but are not limited to the user defined rule examples provided in relation to FIG. 6. The prioritization module 706 may be used to evaluate a user's interruptible computing instances 704 using the system defined rules 708 and assign a instance priority value to the interruptible computing instances 704 based in part on the system define rules 708, which may be periodically updated as execution conditions for the interruptible computing instances change.

Figure 8:
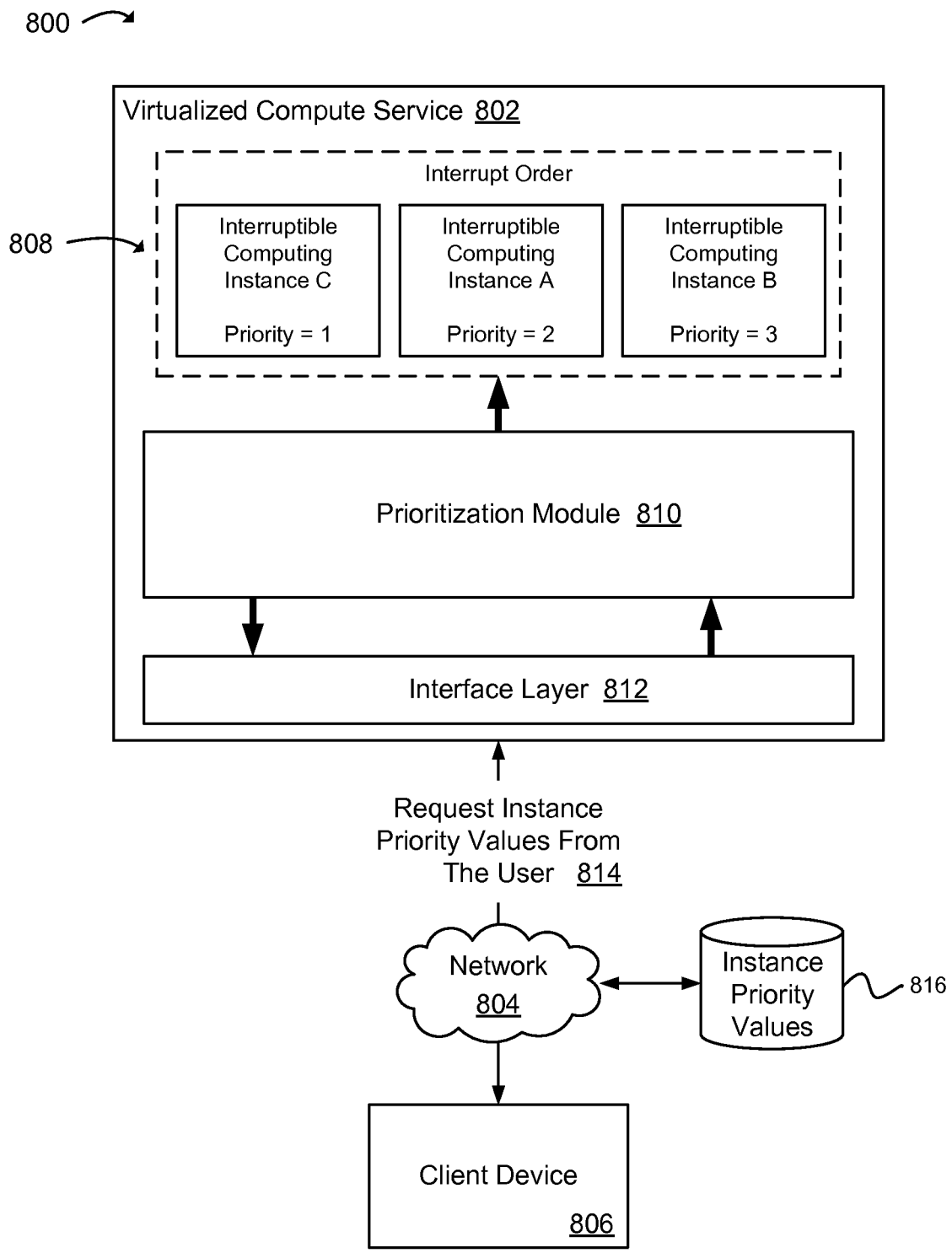
FIG. 8 is a block diagram illustrating an example system for requesting instance priority values from a user.

FIG. 8 is a block diagram illustrating an example system 800 used to request instance priority values for user monitored interruptible computing instances 808 having the same bid amount. The system 800 may include a virtualized compute service 802 executing a number of interruptible computing instances 808 owned by a user, a prioritization module 810 and an interface layer 812 exposing an API or other such interface that allows for communication between the prioritization module 810 and a client device 806 via a network 804. In this example, the prioritization module 810 may request instance priority values 814 for the executing interruptible computing instances 808 from the client device 806. In one example, an initial request for the instance priority values may be made shortly after launching the interruptible computing instances 808. In another example, a request for instance priority values 814 may be made when the interruptible computing instances 808 are launched. In yet another example, a request for instance priority values 814 may be made when a request to interrupt an interruptible computing instance 808 is received and the interruptible computing instances 808 have not yet been prioritized.

For example, a request to reclaim computing resources used to execute non-prioritized interruptible computing instances 808 may be received. Rather than selecting a random interruptible computing instance 808 to interrupt, a request for instance priority values 814 may be sent to a user via the client device 806. If the user does not respond with instance priority values within a set amount of time (e.g., via a defined rule or predetermined instance priority values), a random interruptible computing instance 808 may be selected for interruption.

In one example configuration, a client device 806 may respond to a request for instance priority values 814 by evaluating one or more interruptible computing instance attributes and determining instance priority values for the interruptible computing instance 808 using one or more defined rules, and then sending the instance priority values to the prioritization module 810. As an illustration, upon receiving a request for instance priority values 814, the client device 806 may request execution information for the interruptible computing instances 808, which may then be used to evaluate the interruptible computing instances 808 based on user defined rules, and then assign instance priority values to the interruptible computing instances 808. In another example, predetermined instance priority values based on interruptible computing instance job assignments or job type may be sent to the prioritization module 810. For example, a user may predetermine an instance priority value for an interruptible computing instance based on a job or job type performed by the interruptible computing instance. When the request for instance priority values 814 is received by the client device 806, the client device 806 may provide the predetermined instance priority values. In another example configuration, a user may receive a request for instance priority values 814 for interruptible computing instances 808 via the client device 806, at which time, the user may manually enter instance priority values for the interruptible computing instances 808 by way of a graphical user interface.

In an alternative example configuration, a network storage may be queried for instance priority values 816 for the interruptible computing instances 808. The network storage, in one example, may be a relational data store or a storage providing an object storage architecture via a network service interface. A user may store the instance priority values and/or user defined rules in the network storage and make the instance priority values and/or user defined rules available to the prioritization module 810.

Additional requests for instance priority values 814 may be periodically made to the client device 806 as execution conditions of the interruptible computing instances 808 change that may warrant reordering the priority of the interruptible computing instances 808. For example, an additional request for instance priority values 814 may be made based on a passage of time (e.g., every 10 minutes, every half hour, every hour, etc.) or based on a change in execution of the interruptible computing instance 808. As an illustration, when an interruptible computing instance with an assigned top instance priority value completes a task, a request may be sent to a client device 806 requesting updated instance priority values for the interruptible computing instance 808. After receiving instance priority values for the interruptible computing instances 808, the prioritization module 810 may then be used to assign the instance priority values to the interruptible computing instances 808.

Figure 9:
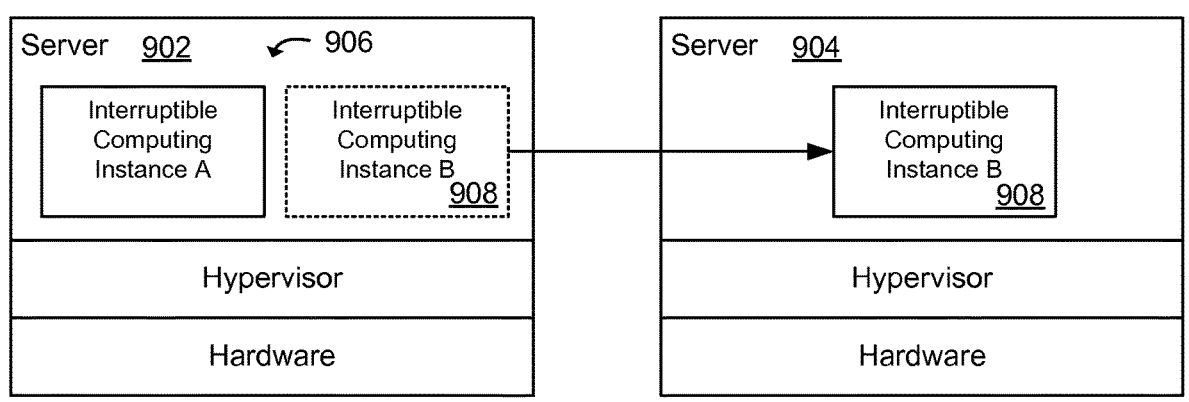
FIG. 9 is a block diagram that illustrates an example of migrating an interruptible computing instance from a first server to a second server.

FIG. 9 is a block diagram illustrating an example system and method for migrating an executing interruptible computing instance 908 from a first server 902 to a second server 904 when computing resources of the first server 902 are reclaimed for another purpose. In some cases, honoring a priority assigned to an interruptible computing instance 908 may involve live migrating or hot swapping an interruptible computing instance 908 to another computing device. For example, an interruptible computing instance 908 may be a specific type of computing instance (e.g., a compute optimized instance, a memory optimized instance or a GPU optimized instance) executing on hardware that may be reserved for a computing instance reserved by another user. In a case where the reserved instance owner makes a request to use the hardware executing the prioritized interruptible computing instance 908, the interruptible computing instance 908 may be moved (i.e., migrated) to available hardware capable of executing the interruptible computing instance 908.

As an illustration, a server 902 may be executing a number of prioritized interruptible computing instances 906. A request may be received to interrupt an interruptible computing instance 908 that has been assigned a high priority. In order to honor the priority of the interruptible computing instance 908, the interruptible computing instance 908 may be moved from a first server 902 to a second server 904 without terminating the interruptible computing instance 908. The computing resources of the first server 902 may then be made available for another task associated with the request to interrupt.

FIG. 10 is a diagram that illustrates an example method 1000 for reconfiguring a number of interruptible computing instances 1002 in order to release sufficient computing capacity to satisfy a request to interrupt that would otherwise cause interruption of a high priority interruptible computing instance (e.g., the large interruptible computing instance 1004). In one example, interruptible computing instances 1002 may be configured into various types of computing instances. For example, interruptible computing instance types may include varying combinations of CPU, memory, storage, and networking capacity to provide a user the flexibility to choose an appropriate mix of resources for the user's applications. In addition, interruptible computing instance types may include one or more interruptible computing instance sizes. When a request to interrupt an interruptible computing instance 1002 is received, the request may specify a type of interruptible computing instance 1002 needed to fulfill the request to interrupt. As a specific example, a request to interrupt may specify that a large interruptible computing instance 1004 is needed to fulfill an on-demand computing request or a reserved computing instance request.

In order to honor a priority order assigned to a user's interruptible computing instances 1002, rather than interrupting an interruptible computing instance having a high priority, interruptible computing instances having a lower priority may be interrupted and reconfigured to satisfy an interruption request. Continuing the specific example above, in order to satisfy an interruption request for a large interruptible computing instance 1004, a number of small interruptible computing instances 1006 and 1008 having a low priority may be interrupted and the computing resources used to construct the small interruptible computing instances 1006 and 1008 may be used to construct a large interruptible computing instance 1010, which can then be used to satisfy the request to interrupt.

FIG. 11 is a flow diagram illustrating an example method 1100 for prioritizing a number of interruptible computing instances. Beginning in block 1110, a request may be received to interrupt at least one interruptible computing instance that may be executing within a virtualized computing environment and may be included in a group of interruptible computing instances having assigned instance priority values that establish an order in which the interruptible computing instances are interrupted. Further, in one example, the group of interruptible computing instance may belong to an individual user and a bid for the group of interruptible computing instances may be the same bid amount for each of the interruptible computing instances. The user may assign an instance priority value to the interruptible computing instances or the user may provide defined rules that may be used to determine an instance priority value for an interruptible computing instance. In another example, system defined rules may be used to determine instance priority values for the interruptible computing instances.

In one example, prior to launching an interruptible computing instance, an initial instance priority value may be assigned to the interruptible computing instance. For example, the initial instance priority value may be set to an instance priority value equal to other interruptible computing instance priority values within a group, thereby making the interruptible computing instance equally subject to interruption. Also, an initial instance priority value may be provided by a user based on the user's reasoning (e.g., a job that is to be performed, an interruptible computing instance type, etc.). After launching an interruptible computing instance, an instance priority value for the interruptible computing instance may be assigned (e.g., in a case where an initial instance priority value was not assigned), or an initial instance priority value may be updated. As interruptible computing instances execute, instance priority values for the interruptible computing instances may be periodically updated as execution conditions change for the interruptible computing instances as described earlier.

After receiving a request to interrupt at least one interruptible computing instance, as in block 1120, at least one interruptible computing instance in the group of interruptible computing instances that has a lower instance priority value as compared to other instance priority values assigned to the interruptible computing instances may be identified for interruption. Then, as in block 1130, the interruptible computing instance(s) that have been identified may be interrupted (e.g., terminated), and the computing resources used to execute the interrupted interruptible computing instance(s) may then be reclaimed and used for another purpose.

Figure 12:
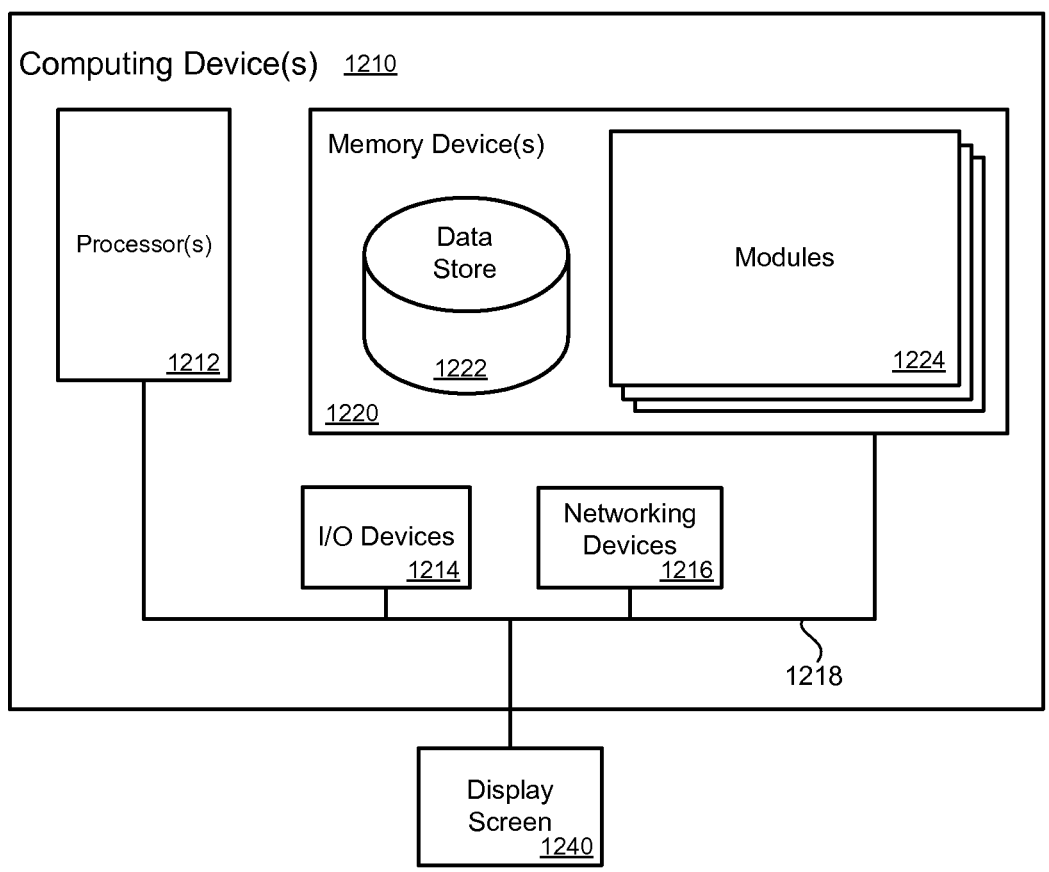
FIG. 12 is block diagram illustrating an example of a computing device that may be used to execute a method.

FIG. 12 illustrates a computing device 1210 on which modules of this technology may execute. A computing device 1210 is illustrated on which a high level example of the technology may be executed. The computing device 1210 may include one or more processors 1212 that are in communication with memory devices 1220. The computing device 1210 may include a local communication interface 1218 for the components in the computing device. For example, the local communication interface 1218 may be a local data bus and/or any related address or control busses as may be desired.

The memory device 1220 may contain modules 1224 that are executable by the processor(s) 1212 and data for the modules 1224. For example, the memory device 1220 may include a prioritization module, an interruption module, a migration interface module and other modules 1224 that may be located in the memory device 1220. The modules may execute the functions described earlier. A data store 1222 may also be located in the memory device 1220 for storing data related to the modules and other applications along with an operating system that is executable by the processor(s) 1212.

Other applications may also be stored in the memory device 1220 and may be executable by the processor(s) 1212. Components or modules discussed in this description that may be implemented in the form of software using high programming level languages that are compiled, interpreted or executed using a hybrid of the methods.

The computing device may also have access to I/O (input/output) devices 1214 that are usable by the computing devices. An example of an I/O device is a display screen 1240 that is available to display output from the computing devices. Other known I/O device may be used with the computing device as desired. Networking devices 1216 and similar communication devices may be included in the computing device. The networking devices 1216 may be wired or wireless networking devices that connect to the internet, a LAN, WAN, or other computing network.

The components or modules that are shown as being stored in the memory device 1220 may be executed by the processor(s) 1212. The term "executable" may mean a program file that is in a form that may be executed by a processor 1212. For example, a program in a higher level language may be compiled into machine code in a format that may be loaded into a random access portion of the memory device 1220 and executed by the processor 1212, or source code may be loaded by another executable program and interpreted to generate instructions in a random access portion of the memory to be executed by a processor. The executable program may be stored in any portion or component of the memory device 1220. For example, the memory device 1220 may be random access memory (RAM), read only memory (ROM), flash memory, a solid state drive, memory card, a hard drive, optical disk, floppy disk, magnetic tape, or any other memory components.

The processor 1212 may represent multiple processors and the memory 1220 may represent multiple memory units that operate in parallel to the processing circuits. This may provide parallel processing channels for the processes and data in the system. The local interface 1218 may be used as a network to facilitate communication between any of the multiple processors and multiple memories. The local interface 1218 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions being executable by a processor to perform a method for prioritizing interruptible computing instances, comprising:

receiving a request to interrupt at least one interruptible computing instance included in a group of interruptible computing instances, wherein interruptible computing instances included in the group of interruptible computing instances have a same bid, and wherein an interruptible computing instance is an implementation of a virtual machine;

receiving user assigned instance priority values for interruptible computing instances included in the group of interruptible computing instances, wherein the instance priority values establish a priority in which the interruptible computing instances are interrupted;

identifying a particular interruptible computing instance from among the group of interruptible computing instances based on the particular interruptible computing instance having a lower instance priority value as compared to instance priority values assigned to other interruptible computing instances included in the group of interruptible computing instances;

sending a user-notification indicating that the particular interruptible computing instance is going to be interrupted; and interrupting the particular interruptible computing instance that has the lower instance priority value.

2. A non-transitory machine readable storage medium as in claim 1, further comprising setting instance priority values for the group of interruptible computing instances to an initial value that is the same for the interruptible computing instances included in the group of interruptible computing instances.

3. A computer implemented method, comprising:
under control of one or more computer systems configured with executable instructions,
receiving a request to interrupt at least one computing instance included in a group of interruptible computing instances;
providing a user-notification that the at least one interruptible computing instance is going to be interrupted;
requesting user-assigned instance priority values for interruptible computing instances included in the group of interruptible computing instances that are non-prioritized;
receiving the user-assigned instance priority values that establish an order in which interruptible computing instances in the group of interruptible computing instances are interrupted;
identifying an interruptible computing instance in the group of interruptible computing instances that has a lower instance priority value as compared to other instance priority values assigned to the interruptible computing instances in the group of interruptible computing instances;
sending a user-notification indicating that the interruptible computing instance is going to be interrupted; and
interrupting the interruptible computing instance that has the lower instance priority value.

4. A method as in claim 3, further comprising receiving a user assigned instance priority value for an executing interruptible computing instance via an API (Application Programming Interface) and associating the user assigned instance priority value with the executing interruptible computing instance.

5. A method as in claim 3, further comprising grouping interruptible computing instances based at least in part on an attribute associated with the interruptible computing instances.

6. A method as in claim 3, further comprising periodically receiving a user assigned instance priority value for an executing interruptible computing instance and updating an assigned instance priority value for the executing interruptible computing instance with the user assigned instance priority value.

7. A method as in claim 3, further comprising providing a user with a graphical user interface displaying a list of the group of interruptible computing instances with associated priority fields in which the user may specify an instance priority value for a interruptible computing instance.

8. A method as in claim 3, further comprising providing a user with a graphical user interface displaying a list of the group of interruptible computing instances where the list of the group of interruptible computing instances is reordered via a drag and drop function provided by the graphical user interface.

9. A method as in claim 3, further comprising receiving a user defined rule for determining an instance priority value for an interruptible computing instance where the defined rule specifies at least one attribute associated with an interruptible computing instance that is quantified in order to determine the instance priority value.

10. A method as in claim 9, wherein receiving a user defined rule further comprises receiving a user defined rule selected from at least one of: assigning an instance priority value based in part on an execution time of an interruptible computing instance that has accrued since a launch of the interruptible computing instance, assigning an instance priority value based in part on an execution time of a job being performed by an interruptible computing instance, assigning an instance priority value based in part on CPU utilization of an interruptible computing instance, assigning an instance priority value based in part on a number of connections between an interruptible computing instance and other virtual computing service components, assigning an instance priority value based in part on an amount of data being utilized by an interruptible computing instance or assigning an instance priority value based in part on job metadata associated with an interruptible computing instance.

11. A method as in claim 3, further comprising retrieving a system defined rule for determining an instance priority value for an interruptible computing instance where the system defined rule specifies at least one attribute associated with an interruptible computing instance that is quantified in order to determine the instance priority value.

12. A method as in claim 3, further comprising requesting an instance priority value for an interruptible computing instance from a client device associated with a user.

13. A method as in claim 3, further comprising reconfiguring the group of interruptible computing instances in order to release sufficient computing capacity to satisfy a request to interrupt that would otherwise cause interruption of a high priority interruptible computing instance included in the group of interruptible computing instances.

14. A method as in claim 3, further comprising migrating an executing interruptible computing instance from a first physical computing device to a second physical computing device when the first physical computing device is reclaimed for a reserved instance.

15. A method as in claim 3, further comprising assigning an initial instance priority value to an interruptible computing instance based on a launch order of the interruptible computing instance, wherein a launch order is an order in which the group of interruptible computing instances are initialized and executed within a virtualized computing environment.

16. A system for virtual interruptible computing instance prioritization, comprising:
a processor;
a memory device including instructions that, when executed by the processor, cause the system to:
expose an API (Application User Interface) that receives instance priority values defined by a user associated with a group of interruptible computing instances, wherein an interruptible computing instance is an implementation of a virtual machine;
assign the instance priority values to interruptible computing instances included in the group of interruptible computing instances, wherein the instance priority values establish an order in which the interruptible computing instances are interrupted, and the instance priority values are determined using a user defined rule selected from at least one of: assigning an instance priority value based in part on an execution time of an interruptible computing instance that has accrued since a launch of the interruptible computing instance, assigning an instance priority value based in part on an execution time of a job being performed by an interruptible computing instance, assigning an instance priority value based in part on CPU utilization of an interruptible computing instance, assigning an instance priority value based in part on a number of connections between an interruptible computing instance and other virtual computing service components, assigning an instance priority value based in part on an amount of data being utilized by an interruptible computing instance or assigning an instance priority value based in part on job metadata associated with an interruptible computing instance;

identify at least one interruptible computing instance to interrupt based in part on the instance priority values assigned to the interruptible computing instances; and send a user-notification indicating that the at least one interruptible computing instance is going to be interrupted.

17. A system as in claim 16, wherein the memory device includes instructions that, when executed by the processor, cause the system to migrate an executing interruptible computing instance from a first physical computing device to a second physical computing device when the first physical computing device is reclaimed for another computing instance.

18. A system as in claim 16, wherein the memory device includes instructions that, when executed by the processor, cause the system to receive a defined rule for determining an instance priority value for an interruptible computing instance where at least one attribute associated with an interruptible computing instance is quantified and used to determine an instance priority value.

19. A system as in claim 18, wherein the memory device includes instructions that, when executed by the processor, cause the system to periodically update the instance priority values assigned to the interruptible computing instances based in part on the defined rule.

* * * * *